May 20, 1969 A. E. MARTENS 3,445,639
ELECTRICAL CONTROL SYSTEM FOR REPETITIVE OPERATION
Filed Dec. 29, 1965 Sheet 1 of 5
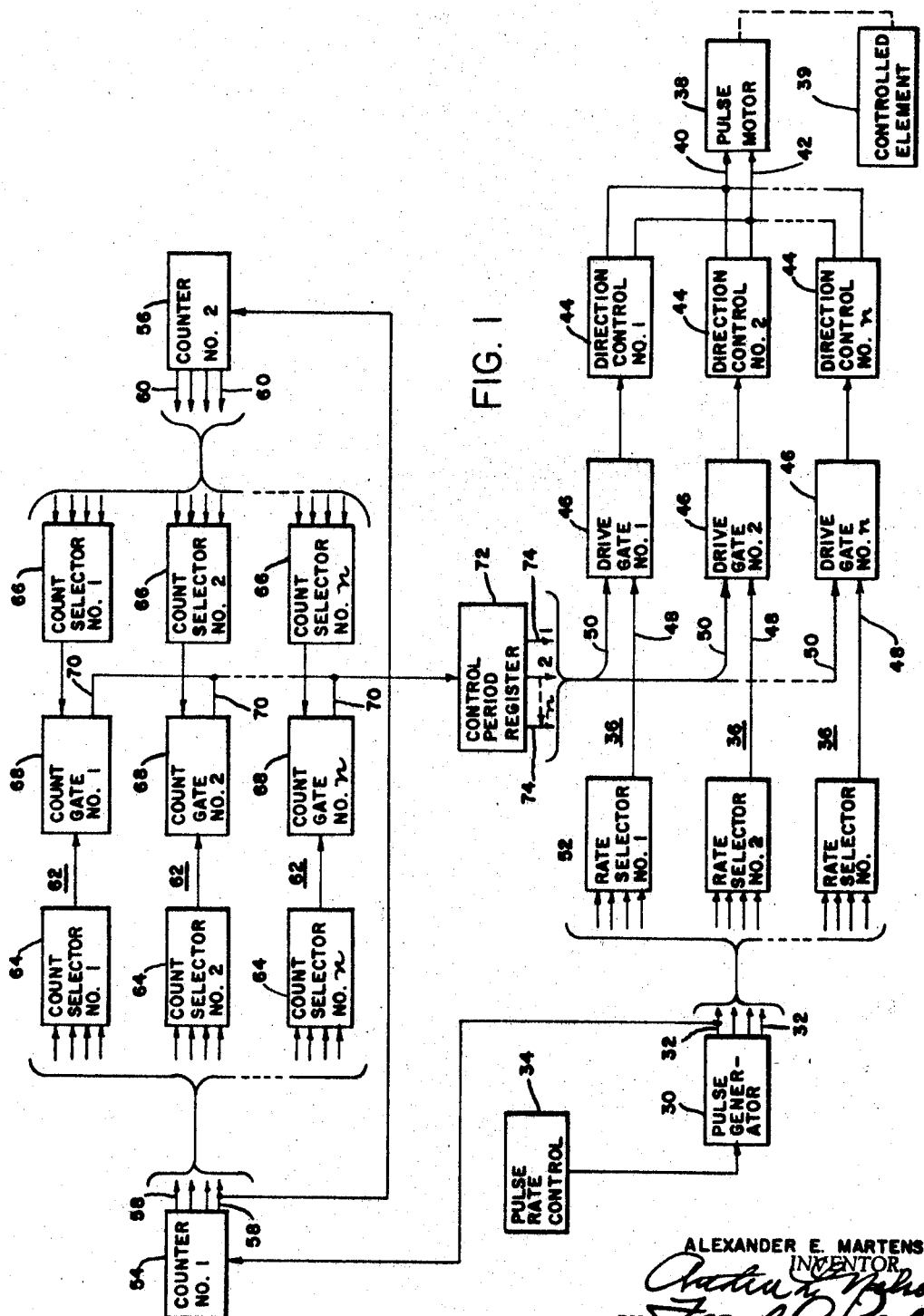
ALEXANDER E. MARTENS
INVENTOR
BY
ATTORNEYS

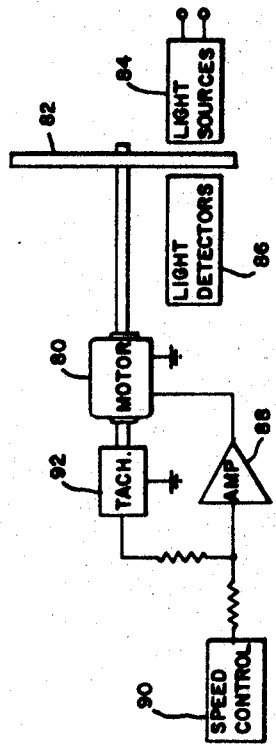
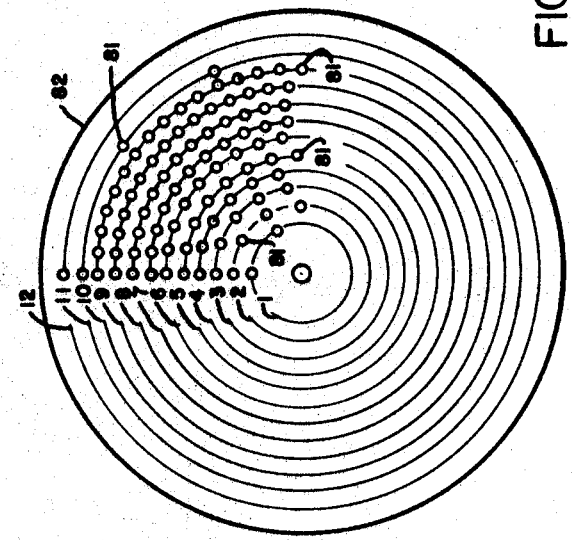
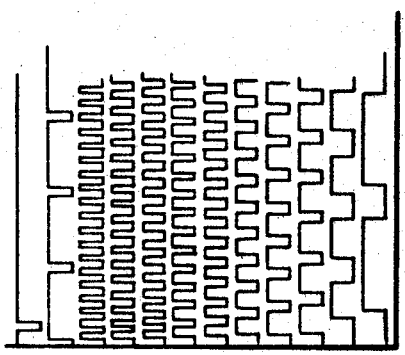
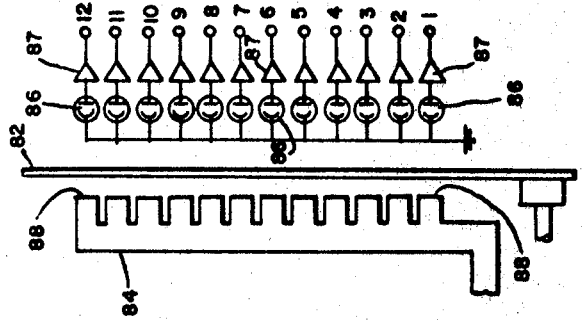
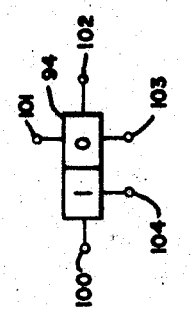

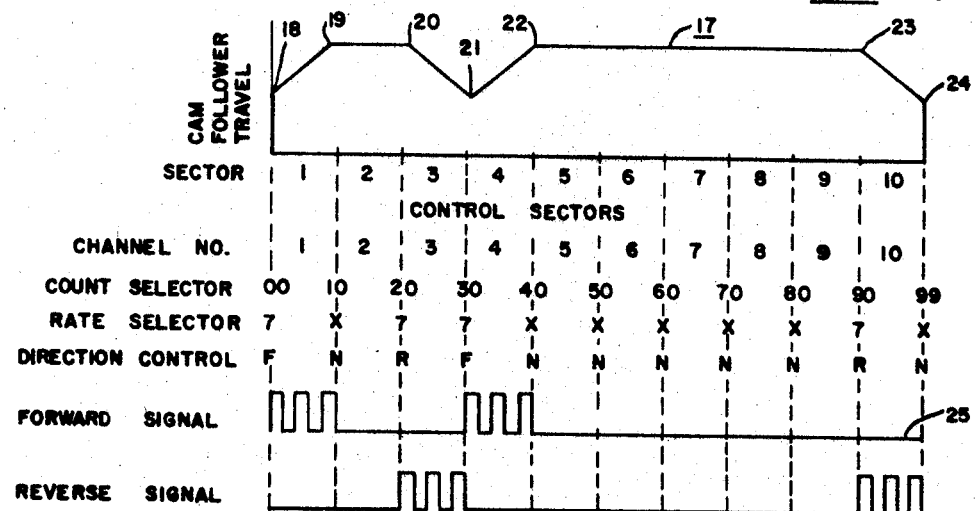
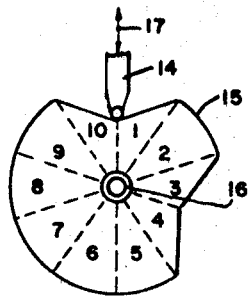
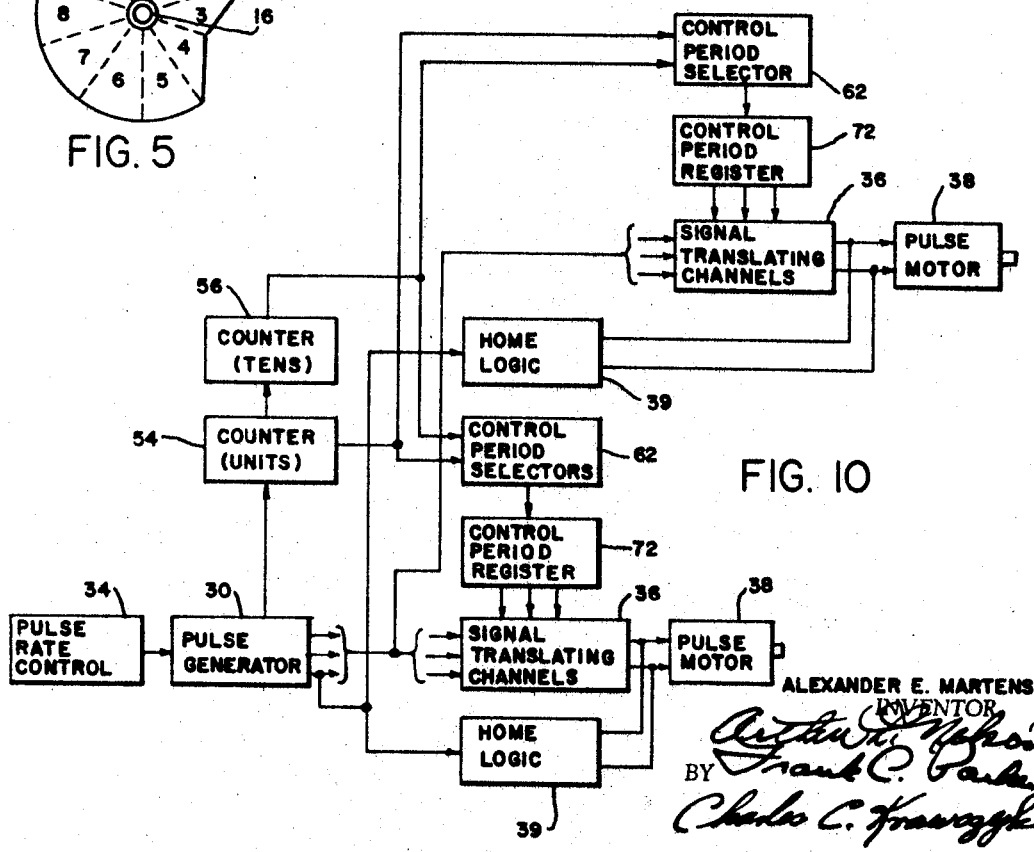

United States Patent Office 3,445,639
Patented May 20, 1969

3,445,639
ELECTRICAL CONTROL SYSTEM FOR REPETITIVE OPERATION
Alexander E. Martens, Greece, N.Y., assignor to Bausch & Lomb Incorporated, Rochester, N.Y., a corporation of New York
Filed Dec. 29, 1965, Ser. No. 526,961
Int. Cl. G06f 15/46; G06g 7/48
U.S. Cl. 235—151.1                    14 Claims

ABSTRACT OF THE DISCLOSURE

A control system is disclosed including a generator providing a plurality of signals of different frequencies. A variable circuit couples the generating means to a plurality of switching circuits so that selected ones of the periodic signals to be translated are applied thereto. A counting circuit is connected to count at least one of the signals to provide successive switching signals to the switching circuit having a variable preset time durations and renders the switching circuits operative in a predetermined order to pass successive trains of the periodic signals.

---

This invention relates to control systems in general and more particularly to control systems adapted for providing repetitive operation.

It is well known that considerable cost savings and an improved quality control can be achieved by the automation of manufacturing processes. This is particularly true in high volume production items wherein the automatic process can be programmed to repeat a continuous series of controlled steps per each item produced. In such processes, a plurality of controlled or forming elements are simultaneously controlled for synchronous and repeatable movement along predetermined paths that are correlated in space and time as the material is fed into the machines. This includes the establishment of a predetermined starting position and controlling the movement of the controlled elements from the starting position (amount and rate) in at least one direction for simultaneous arrival at a predetermined position to provide a continuous path type control.

A particular illustration of such processes are spring forming machines wherein three basic movements are required to control the forming of the spring, i.e., diameter, pitch and rate of feed of the wire. Presently the controlled elements of the spring forming machines are mechanically controlled through the use of cams. A specially formed cam, coupled to rotate about a reference point such as a shaft, is provided for each of the controlled elements. The controlled elements are generally restrained for limited movement in a straight line and are spring coupled to urge against the cam through a cam follower so that the controlled element follows a controlled path along the straight line as determined by the shape of the cam.

As the cam is rotated, the amount of movement of the controlled element from the starting position is governed by the distance between the cam shaft and the cam follower, while the rate of movement at any particular instant of time is determined by the tangent of the curve at the point wherein the cam is in contact with the cam follower. Each of the cam shafts are coupled together to correlate the paths in space and time to provide for the required contour control.

In such mechanically cam controlled processes the initial setup is complex and time consuming. The movement of a plurality of controlled elements and material feed must be mechanically precisely correlated or adjusted for the required space and time relation through a variety of adjustable cam linkages. Such precise correlation becomes more of an art than a predictable process requiring a considerable shutdown time each time the shape of the device to be built is to be changed or to correct errors in the initial setup. In many cases the down time becomes a substantial portion of the total operating time of the machine.

The entire setup procedure can be greatly simplified with improved accuracy and repeatability by substituting an electronic control system for the mechanical system wherein the motion of the cam is simulated electronically and wherein each control element is mechanically independent but synchronously controlled. With such a control system, the controlled movement of each controlled element can be separately adjusted and the entire system synchronized through the use of electronic timing signals.

The control system for such processes must include economical data entry means for controlling the path of the tools and/or materials to provide a large combination of shapes that can be formed by the automated process. In addition, the control system should include simple means for modifying the path of the tool, etc., after a trial run on an item has been made to correct any errors in the original programmed tools, etc., path wherein such changes should not require a considerable period of machine shutdown.

The use of conventional electronic control or computer systems employing magnetic tape or magnet drum data storage is not readily adaptable because of the expense and complexity of the transport, recording and reading equipment. Furthermore, the amount of input data required to effectively simulate a cam is limited wherein the expense of a high density data storage of the magnetic tape or drum is not justified. Furthermore programming devices as punched tape and cards, etc., are not readily adaptable to high speed repetitious cycling due to wear and tear from continuous use. Finally, conventional magnetic or punched card computer data entry systems are generally complex, requiring specially trained personnel to develop the programmed devices for these systems.

A copending application of the same assignee and same inventor Ser. No. 526,965 sets forth plural motion control device by storing the information in the form of perforations in a digital cam. These perforations permit passage of light which is sensed by photosensors which in turn generate electrical signals to control the operation of the machine. Motion in more than one direction is simultaneously fed into the machine which provides plural motion control of the tool. Any type of motion may be provided through the use of such a motion control device and the information is permanently stored in the form of the digital cam.

So long as a relatively small number of digital cams is sufficient for the purpose of manufacturing, this type of information storage is adequate. Where an infinite number of different shapes are to be formed, it is then desirable to include a variable data entry means that can be simply preset at the desire of the operator to perform desired forming processes.

It is therefore an object of this invention to provide a new and improved control system.

It is also an object of this invention to provide a new and improved variable signal generating means for control systems for electronically simulating the action of mechanical cams.

It is also an object of this invention to provide a new and improved control system that is particularly adapted for high speed repetitive controlled movement.

It is a further object of this invention to provide a new and improved variable control system for simultaneously and electronically controlling a plurality of controlled elements along predetermined paths that are correlated in space and time.

It is still a further object of this invention to provide a new and improved signal generating system for controlling the motion of a device that can be modified while the system is in operation.

It is a further object of this invention to provide a motion control system having circuit means for setting a changeable pattern of information to control the motion of an element.

It is also an object of this invention to provide a control system providing a large number of variably adjustable position control paths.

A control system embodying the invention includes a plurality of signal translating channels, each including switching means, such as gating circuits, for translating signals applied thereto while a switching signal is applied to turn the channel on. A signal generating means is included for providing a plurality of periodic signals at different frequencies. Circuit means, such as a plurality of selector switches, are connected to apply various ones of said periodic signals to said signal translating channels as the signals to be translated.

Circuit means including at least one counter circuit is also coupled between the signal generating means and the signal translating stages for counting at least one frequency of the generated periodic signals and for providing a plurality of successive switching signals having an adjustable preset time duration and sequence. The switching signals are coupled to the signal translating circuits to turn each signal translating channel on and off in consecutive order thereby providing a plurality of control periods. An output signal developed by each channel includes a train of periodic signals, frequency of which is determined by the generated periodic signal applied thereto while the number of cycles therein is determined by the duration of the applied switching signal.

The signal generating means is adapted to provide the drive signal for a controlled element positioning device or motor means. Circuit means are provided for connecting the plurality of signal translating channels to the positioning device so that its movement per control period (per switching signal) is dependent upon the number of cycles of signals in the control period while the rate of movement is a function of the frequency of the signals.

A further feature of the invention includes means for controlling the frequency of the generated periodic signals so that the frequencies can be increased or decreased simultaneously and proportionally so that the same frequency ratio remains between the plurality of periodic signals. With such a control, the number of pulses per control period remains as preselected although the control period duration changes so that the movement per control period remains the same, but the rate of movement changes correspondingly.

A stil further feature of the invention includes provisions for resetting the counting circuit upon completion of an operation and for providing means, coupled to the positioning device, to position said device in a start position for another cycle of operation so that the control cycle can be continuously repeated.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIGURE 1 is a block diagram of a control system embodying the invention.

FIGURE 2 is a block diagram of the signal generator and signal rate control system of FIGURE 1.

FIGURE 3 is a plan view of the signal generating disk of FIGURE 2 and a tabulation of the number of holes therein.

FIGURE 4 is a schematic diagram of the light sources and light detectors of FIGURE 2 and the timing sequence between signals generated by the detectors.

FIGURE 5 is an illustration of a mechanical cam and a cam follower.

FIGURE 6 illustrates the continuous path motion of the cam follower as a function of the rotation of the cam, the settings of the various controls and the drive signals of the control system to produce a similar motion electrically.

FIGURE 9 is a block diagram of a flip-flop stage employed in FIGURES 7 and 8.

FIGURE 10 is a block diagram of a control system embodying the invention for simultaneously driving a plurality of controlled elements or for simultaneously driving a single controlled element in several directions.

Figure 7:
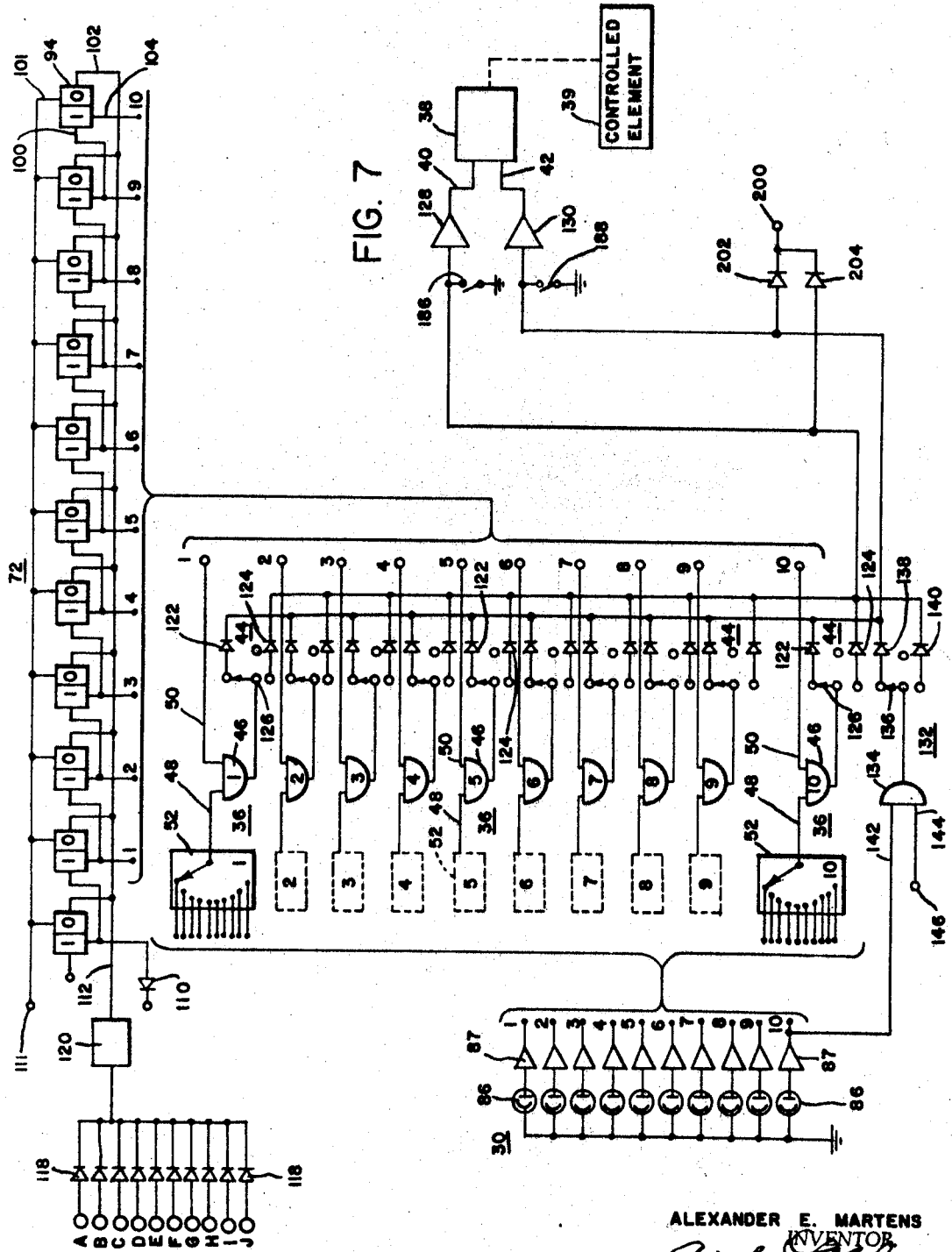
FIGURE 7 is a block diagram of a portion of the control system of FIGURE 1 including provisions for cyclic operation.

In the automation of high speed repetitious manufacturing processes, such as spring making machines, economical data entry is required to provide a simultaneous continuous path type of control of a plurality of controlled devices such as forming tools and the materials to be formed. By continuous path we mean the travel paths of the tools and materials are in contact and are synchronously controlled with respect to a common time reference so that they arrive at a required position at a predetermined time. The travel paths in most cases are neither constant nor unidirectional so provisions must be made for changes in direction and velocity. In addition, the data entry must be sufficiently flexible so that a great number of controlled movements can be provided so that the automated process is not limited in its use.

As previously mentioned the controlled elements of a forming process such as a spring forming machine are mechanically controlled through the use of a cam and follower mechanism. FIGURE 5 is an illustration of a cam and followed mechanism wherein a cam follower 14 engages the peripheral surface of a cam 15 to provide linear motion (continuous path) along the direction designated by the arrows 17. The cam 15 is divided into ten equal sectors for purposes of illustration. As the cam 15 is rotated at a constant speed, each sector controls the movement of the cam follower 14 for an equal period of time. The movement of the cam follower 14 from the starting position (as illustrated in FIGURE 5) is governed by the distance between the cam shaft 16 and the portion of the cam 14 engaging the cam follower 15. The rate of movement of the cam follower 14 for any particular sector is determined by the tangent to the curve at the point where the cam is in contact with the cam follower 14.

The continuous path of the cam follower 14 is plotted in the curve 17 of FIGURE 6 as a function of the rotation of the cam 15. If the cam 15 is rotated at a constant speed, the continuous path 17 can also be considered as plotted as a function of time. The continuous path 17 can be defined as divided into a plurality of equal time sectors (corresponding to the number of sectors in a revolution of the cam 15) having seven control data points 18–24, wherein the parameters governing the cam follower 14 movement are changed.

In a control system embodying the invention, electronic means are provided to develop a drive signal for a control element positioning device. The electronic means generate a drive signal that electronically simulates the motion of a cam wherein the continuous path of a controlled element is divided into a large number of equal time sectors by eletcronic timing signals. Circuit means are provided for variably entering a sufficient number of control points among the time sectors to change the parameters governing the movement of the controlled element according to the desired continuous path.

Referring now to FIGURE 1, the control system includes a variable signal generating means of pulse generator 30 for generating a plurality of signals or pulses of different frequencies of pulse rates. The pulse generator includes a plurality of output circuits designated by the lines 32 wherein signals of different frequencies are generated on each of the output circuits. Only five output circuits are shown for the purpose of illustration, but any number of desired frequencies can be included.

The frequencies of the generated signals are controlled by the pulse rate control 34. The pulse rate control 34 provides a means for varying the output frequencies of the pulse generator 30 in a continuous manner wherein the signal frequencies can be increased or decreased simultaneously and proportionally so that the same frequency ratio remains between the plurality of generated frequencies. As embodiment of the pulse generator 30 and the pulse rate control 34 is fully covered in connection with the FIGURES 2, 3 and 4.

The control system also includes a plurality of signal translating channels 36 designated by the numbers 1, 2 . . . n. The number of signal translating channels corresponds to the number of control periods into which the travel path is divided, i.e., one separate channel for each control period. The signal translating channels 36 are rendered operative in successive order for a predetermined control period in accordance with their designated number (1, 2 . . . n) as fully explained in a later portion of the specification.

Each of the plurality of signal translating channels 36 include a separate direction control means 44 coupled to drive a positioning device, which, in the present embodiment is a pulse or stepping motor 38. The pluse motor 38 coupled to drive a controlled element 39 is responsive to a cycle or pulse of input signal for developing a controlling movement per cycle or pulse received. in the particular embodiment two separate input circuits 40 (forward) and 42 (reverse) are including in the pulse motor 38 for providing a means for controlling the direction of the output movement. It will be understood of course, that other methods of controlling the direction of the pulse motor 38, such as reversing signal polarity, switching field windings, etc., can also be employed.

Each signal translating channel 36 also includes a switching means or a drive gate circuit 46 for rendering the signal translation channel operative for a control period of predetermined duration. The drive gate circuit 46 is of the type wherein a signal applied to one input circuit 48 will be developed in an output circuit during the period at which a switching signal is applied to a second input circuit 50 to render the circuit operative.

Each of the signal translating channels 36 also includes a rate selector means 52 such as a multiposition selector switch. Selected ones of the pulse generator 30 output circuits 32 are connected to each of the rate selector means 52. Each of the rate selector means 52 is adapted to connect at least one of the selected signal frequencies to the first input circuit 48 of a respectively numbered drive gate circuit 46.

The output signal translating channels 36 comprise a train of pulses, the number of cycles therein being a function of the signal frequency selected by the corresponding rate selector means 52 and for a control period duration determined by a switching signal applied to its drive gate input terminal 50. Only three signals translating stages are shown for purposes of simplicity of illustration, but it is understood that any number of such stages can be included.

Control period switching signals for rendering the signal translating channels 36 operative are provided by a synchronization or timing circuit, which in the present embodiment includes a first counter 54 and a second counter 56. Although two counters are illustrated it is to be understood that a single counter or any desired number can be used depending upon the particular system requirement. The counters 54 and 56 can be of the type wherein a plurality of flip-flop stages are serially connected to provide a plurality output circuit, one output circuit for each of the flip-flop stages, wherein a switching pulse is developed in consecutive ones of the output circuits as the cycles are counted. In the control system of FIGURE 1, only four output circuits per counted have been illustrated, although any number of such circuits can be employed.

Timing or sector pulses to be counted are provided by one of the pulse generator 30 output circuits 32 and are coupled to the first counter circuit 54. The last serially connected flip-flop of the counteer 54 is connected to the input circuit of the counter circuit 56 to apply a signal to be counted for each complete counting cycle of the counter 54. By way of example, the counter 54 can be a units counter requiring ten cycles or pulses for a complete counting cycle while the counter 56 can be a tens counter which will register one count for each of the ten counts registered by the counter 54 for a total sector count of one hundred.

The duration of the control period switching signals and their timing sequence is determined by a plurality of control period selector circuits 62, one for each control period. Each of the control period selector circuits includes a pair of switching means or count selectors 64 and 66 connected to the plurality of counter output circuits 58 and 60, respectively. Each control period selector circuit 62 also includes a counter gate circuit 68 including a first and a second input terminal coupled to the count selectors 64 and 66, respectively. The count selectors 64 and 66 are adapted to variably connect a selected one of the output circuits 58 and 60 to corresponding counter gate 68 first and second input terminals, respectively. When a count corresponding to that selected by the pair of count selectors is counted, a signal is applied to the first and second input terminals of the counter gate 68 and a control pulse is generated at the gate output circuit 70.

Each of the plurality of counter gate 68 output circuits 70 are coupled in common to an input circuit of a control period register 72. The control period register includes a plurality of output circuits 74 (numbered 1, 2 . . . n) one for each signal translating channel 36. Each of the output circuits 74 are connected to the input circuit 50 of a correspondingly numbered drive gate circuit 46 to provide control period switching signals thereto.

In response to a first control pulse from the counter gates 68, the control period register provides a control period switching signal at the output circuit #1 which in turn renders the signal translating channel #1 operative. The signal translating channel #1 will remain operative until a second control pulse is received by the control period register 72 wherein a control period switching signal is removed from the output circuit #1 and applied to the output #2 to render the signal translating channel #2 operative. The process is repeated until each of the signal translating channels 36 is turned off and on in successive numerical order.

The number of time sectors into which the travel path of the controlled device is divided is determined by the number of pulses that must be counted by the counters 54 and 56 in order to turn each signal translating channel 36 on and off. The control data points for changing movement parameters is determined by the "counts" selected by the count selectors 64 and 66. For example, if the count selectors 64 and 66 are set for successively increasing counts according to their designated number, the first control data point is set by control period selector circuit 62 designated as #1, the second control point, by #2 and so forth. When the first control point is counted, the signal translating channel 36 designated as #1 is rendered operative to drive the pulse motor at a rate designated by the connected rate selector 52 in a direction set by the corresponding direction control means 44. When the second control data point is counted the signal translating channel 36, designated as #2, is rendered operative and the channel designated as #1 is cut off. This process is repeated until each signal translating channel is turned on at its designated control data point and turned off by the next successive control data point.

The pulse generated circuit 30 (FIGURE 2) in the particular embodiment is a photoelectric type wherein a motor 80 is coupled to rotate a pulse generating disk 82 between a plurality of light sources 84 and a plurality of light detectors 86. The light sources 84 can be for example, a fiber optic circuit wherein one light output 88 is provided for each of the plurality of light detectors 86 (FIGURE 4). A separate amplifier circuit 87 is connected between each of the light detectors 86 and the pulse generator output terminals 1–12. The pulse generating disk 82 (FIGURE 3) includes a plurality of holes 81 therein arranged in consecutive circles (1–12) about the center. Each circle of holes is positioned between the respective light output 88 and a light detector 86 so that a signal pulse is developed each time a hole passes between the light source and the light detector. The number of holes per circle are tabulated adjacent the disk 82 in FIGURE 3.

As the disk 82 is rotated, the signals generated at the various light detectors 86 vary in frequency or pulse rate according to a present pattern determined by the holes in the disk 82 and as a function of the angular velocity of the disk. With the pulse generating disk 82 of FIGURE 3, the output pulses at the various output terminals 1–12 will follow the pattern illustrated by the curves of FIGURE 4. The curve to the right of each output terminal 1–12 corresponds to the amplified signal generated by each light detector in response to the rotation of the disk 82 as a function of time.

The angular velocity of the pulse generating disk 82 is controlled by a conventional rate control servo system (FIGURE 2). The rate control servo system includes a servo amplifier 88 coupled to drive the motor 80. A variable control signal is developed by a speed control means 90 and applied to the input of the servo amplifier 88. A tachometer 92 is coupled to the shaft of the motor 80 to generate a feedback voltage that is proportional to the angular velocity of the motor shaft. The tachometer voltage is coupled to the input of the servo amplifier 88 so that the speed of rotation of the motor will be accurately determined by the amplitude of the control signal applied by the speed controlled means 90. With this rate control system, the angular velocity of the pulse generating disk 82 can be continuously varied. Since the frequency or pulse rate of the signal generated by the respective light detectors 86 is primarily a function of the angular velocity of the disk 82, the various frequencies or pulse rates generated can be increased or decreased proportionally while the ratio of frequencies remains constant.

Figure 8:
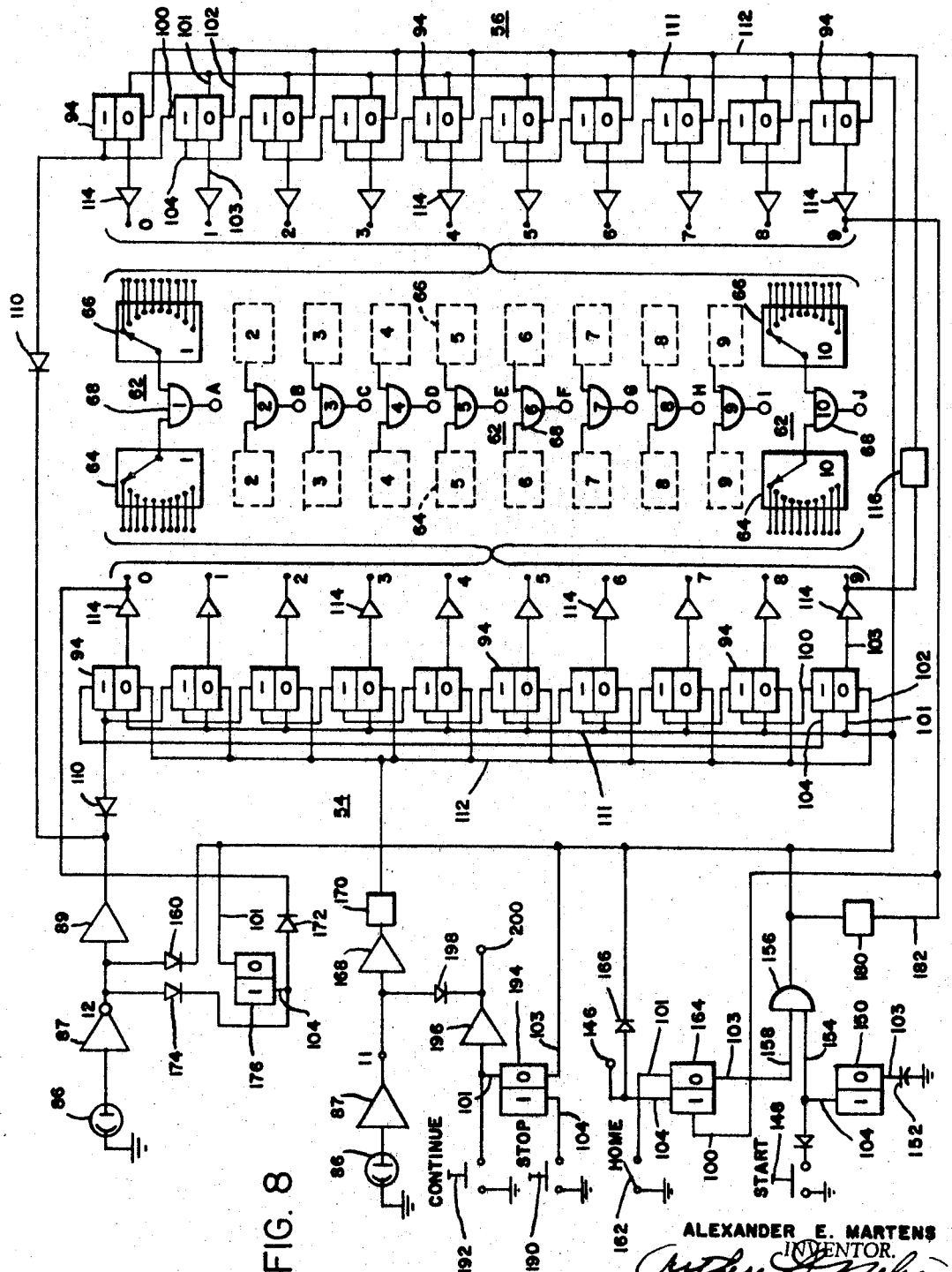
FIGURE 8 is a block diagram of another portion of the control system of FIGURE 1 including provisions for starting and stopping and cyclic operation.

The control system of FIGURE 1 is included in the systems of FIGURES 7 and 8 with provision for cyclic operation. The same reference numbers are used to designate like components in FIGURES 1–10 wherever practical.

As previously mentioned, the tool or material movement in an automated process is not normally constant or unidirectional throughout the process, and it is therefore necessary to provide an adequate number of selectable control data points during the process where parameters governing the tool movement can be changed. In the control system of FIGURES 7 and 8, the path of the tool, etc., is divided into one hundred equal sectors. Ten control data points are included so that the machine operator can change the rate and the direction of tool movement at any of the one hundred sectors for ten control periods. If a higher degree of control is required any number of time sectors, control data points and control periods can be provided.

The counter circuits 54 and 56 of FIGURE 8 include ten serially connected identical block diagram flip-flop stages 94 connected as a shift register, while the control period register 72 of FIGURE 7 includes eleven. The flip-flop stages 94 may, by way of example, be commercially available Fairchild FuL 91429 units. The operation of a flip-flop stage 94 will be explained by reference to FIGURE 9 wherein the flip-flop stage is illustrated as having five signal terminals 100–104. The terminals 100 and 102 are only input terminals while the terminals 101, 103 and 104 can either be input or output terminals.

The flip-flop stages of FIGURES 7, 8 and 9 are illustrated in a recent state wherein a logic "1" (corresponding to an output voltage) is developed at the terminal 104 and a logic "0" (corresponding to zero volt) is developed at the terminals 101 and 103. When the flip-flop stage is set or preset the logic "1" and the logic "0" reverse.

The flip-flop stage is set or preset by applying either a logic "1" to the terminal 100 or a logic "0" to the terminal 104. The flip-flop stage is reset by applying a logic "1" to the terminal 102 or a logic "0" to the terminal 101 or 103.

For purposes of clarity, the terminals of only one flip-flop stage in each shift register is numbered. The rest of the flip-flop stages in each shift register are connected in the same manner as the numbered stage. In addition, only the terminals required for connection to the flip-flop stages are illustrated in each shift register.

In the shift register of the counter circuits 54 and 56, and the control period register 72 all the terminals 101 are connected in common as a reset circuit 111 to receive a logic "0" for switching into an initial reset position to commence a new cycle of counting. Each shift register will not commence counting until a momentary logic "0" is applied to the terminal 104 of the first flip-flop stage of each shift register through the reset diodes 110 to set the first stage.

Each of the flip-flop terminals 102 of the individual shift registers is connected in common as an advance input circuit 112 for receiving pulses to be counted. Once the first flip-flop stage is preset a logic "1" on the advance input 112 causes the first flip-flop stage to reset and the second flip-flop stage to set. The next advance logic "1" causes the second flip-flop stage to reset and the third to set, and so forth. This operation continues until the last stage is "reset" by the advance logic "1." Only the counter circuit 54 is a ring counter wherein the terminal 104 of the tenth flip-flop stage is connected to the terminal 100 of the first flip-flop stage to preset the shift register for another cycle after ten counts. After the last stage of the counter circuit 56 and the control period shift register 72 is reset by an advance logic "1," a preset input is required to set the first flip-flop stage to start another cycle of counting.

A separate inverter amplifier stage 114 is connected between each of the flip-flop terminals 103 and an output terminal (0–9) of the counter circuits 54 and 56. The output terminal #9 corresponding to the tenth flip-flop stage of the counter circuit 54 is connected through an integrator circuit 116 to the advance input circuit (the flip-flop terminals 102 of the counter circuit 56. The counter circuit 56 registers one count for a complete counting cycle (ten) of the counter circuit 54. With this combination, the travel path of the tool, etc., can be divided into one hundred equal time sections per cycle of operation.

Ten control period selector circuits 62 are included in the control system of FIGURE 8 corresponding to the ten signal translating channels 36 of FIGURE 7. The count selectors 64 and 66 in each of the control period selector circuit 62 are illustrated as multiposition selector switches, each including ten stationary contacts and a movable contact (illustrated as an arrow) adapted to make electrical contact with individual ones of the stationary contacts. The stationary contacts of each count selector 64 are connected to a respective one of the output terminals (0–9) of the counter circuit 54 so that the movable contact can make electrical contact with a selected one of the output terminals. The ten stationary contacts of each count selector 66 are connected to the output terminals (0–9) of the counter circuit 56 in the same manner.

The movable contacts of the count selector 64 and 66 are connected to apply signals to the input circuits of the respective count gate circuit 68. In operation, when a count has been counted by the counter circuit 54 and 56 corresponding to that selected by the count selectors 64 and 66, a logic "0" appears simultaneously at both the input circuits of the connected count gate circuit 68. In response to the logic "0" at both input circuits, the count gate circuit 68 develops a logic "1" in its output circuit. The output circuits of the count gate circuit 68 are designated alphabetically (A–J).

Each of the count gate 68 output circuits (A–J) of FIGURE 8 are connected to a correspondingly designated terminal (A–J) in FIGURE 7. The logic "1" developed at the count gate output circuits are coupled through a corresponding one of the plurality of diodes 118 to an integrator circuit 120. The integrator circuit 120 is connected to the advance input circuit 112 (the flip-flop terminals 102) of the shift register of the control period register 72 to apply one count pulse per count gate logic "1." If the shift register was preset as previously mentioned, the first logic "1" input resets the first inactive stage (the bottom flip-flop as viewed in FIGURE 7) and sets the first active stage (second from bottom) for a logic "0" at a control period register output terminal #1. A second logic "1" input resets the first active stage for a logic "1" at the output terminal #1 and sets the second active (third from bottom) stage for a logic "0" at the terminal #2 and so forth. A control period switching signal is developed each time a logic "0" is developed at one of the control period register output terminals 1–10.

Each of the ten output terminals 1–10 of the control period register 72 is connected to an input circuit 50 of a corresponding numbered one of the drive gate circuits 46. Each of the input circuits 48 of the drive gate circuits 46 are connected to a respective one of a movable contact (illustrated as an arrow) of a multiposition switch illustrating an embodiment of a rate selector means 52. Each multiposition switch includes ten stationary contacts, wherein each stationary contact is connected to a respective one of the pulse generator 30 output terminals 1–10 so that each movable contact can make electrical contact with a variably selected one of the pulse generator output terminals.

The signals at the various pulse generator 30 output terminals (FIGURE 4) shift periodically from a logic "0" to a logic "1" and back to a logic "0." With a control period logic "0" applied to the gate input circuit 50, each time the periodic signal applied to the input gate 48 shifts to a logic "0" a logic "1" will appear at the output of the drive gate circuit 46. The frequency of the logic "1" pulses at the drive gate output is determined by the pulse generator 30 output terminal selected to be connected to the gate input circuit 48 by the correspondingly numbered rate selector means 52.

The output circuit of each drive gate circuit 46 is connected to a respective direction control means 44. The direction control means includes a pair of diodes 122 and 124 and a three position selector switch 126 having three stationary contacts and a movable contact. The movable contact of each direction selector switch 126 is connected to the output circuit of the corresponding drive gate circuit 46, while two stationary contacts are connected through the diodes 122, 124 and an amplifier circuit 128 and 130 to the pulse motor input circuit 40 (forward) and 42 (reverse), respectively. The third contact (center contact) is unconnected.

The direction of motion for a given control period is determined by the position of the corresponding direction selector switch 126. If the movable contact is connected to the diode 122, the pulses are applied to the reverse terminal 42. If the movable contact is connected to the diode 124, the pulses are applied to the forward terminal 40. If the movable contact is in the center position (in an open circuit position) no signal pulses are applied to the pulse motor and the controlled tool, etc. remains stationary for the particular control period.

The pulse motor 38 coupled to drive the controlled element 39, as an example, may be commercially available Fujitsu 1/5 SS electrohydraulic pulse motor. The Fujitsu pulse motor is essentially an electrohydraulic stepping motor for providing an accurately duplicated output motion in response to a cycle or pulse of signal applied thereto. The Fujitsu motor includes two input circuits, one for forward motion and the other for reverse motion, wherein the direction of motion is determined by which of the two input terminals the signals are applied.

An eleventh signal translating channel 132 (FIGURE 7) is provided for returning the pulse motor to an initial "home" or "start" position after a cycle of operation is completed. The home channel 132 includes a home gate circuit 134 whose output circuit is connected to a movable contact of a three position direction control selector switch 136. The removable contact is adapted to make electrical contact with a diode 138 coupled to the reverse terminal 42 through the amplifier 130 and with a diode 140 coupled through the amplifier 128 to the forward terminal 40 or to an open circuit position. A first input terminal 142 of the home gate circuit 134 is connected to the pulse generator 30 output terminal #10 for receiving signal pulses. A second gate input circuit 144 is connected to a terminal 146 for receiving a switching signal for rendering the home gate circuit operative.

At the start of each counting cycle a reset logic "0" is first applied to the reset circuits (flip-flop terminals 101) of the shift registers of the counters 54 and 56 and the control period register 72 for conditioning the shift registers for another counting cycle. Once reset the shift registers can not start counting until a preset logic "1" is applied to the first flip-flop stages of each shift register through the diodes 110. One start pulse is developed at the pulse generator 30 output circuit 12 per one complete revolution of the pulse generating disk 82 (each time a single hole in circle 12 passes between the light source 84 and the light detector 86). The start pulse is coupled through the amplifier circuits 87 and 89 to the reset diodes 110 and renders the shift registers in condition for counting.

The sector timing pulses to be counted by the units counter 54 are developed at the pulse generator 30 output terminal #11 (FIGURE 8). In the particular embodiment there are ten holes in the 11th circle of the pulse generating disk 82 (FIGURE 3), wherein ten count pulses are developed for each revolution of the disk. A counting cycle of the counter circuits 54 and 56 (100 counts) is completed after ten revolutions of the disk 82.

When the system of FIGURE 8 is first energized, a start switch 148 is open and the start control flip-flop stage 150 is forced into a reset condition due to a capacitor 152 connected between the terminal 103 and ground. In this condition the flip-flop stage 150 applies a logic "1" to an input circuit 154 of a general reset gate circuit 156. The general reset gate circuit 156 includes two input circuits 154 and 158 wherein a logic "1" at either one of the input circuits, or both, produces a logic "0" at the gate output circuit. The logic "0" developed by the general reset gate 156 is distributed to the reset input circuit (all the flip-flop terminals 101) of the shift register circuits of the counter 54 and 56 and the control period register 72 to reset all the shift registers in condition for a new counting cycle.

The reset logic "0" is also applied to a blocking diode 160 connected to the pulse generator 30 output terminal #12 to prevent a start signal from being applied to the preset diodes 110 while the control system is in the general reset condition (logic "0" output from general reset gate 156).

While the general reset gate 156 is in its reset condition the pulse motor 38 (FIGURE 7) is positioned in an initial home or start position. The home or start position is defined as the reference position which the pulse motor 38 must assume before a new cycle of operation can start. A home indicator limit switch 162 (FIGURE 8) is connected to the output shaft of the pulse motor 38, and is closed to provide a logic "0" signal when the pulse motor 38 is in the home position.

The home circuit (FIGURE 8) includes a home flip-flop stage 164 having a terminal 104 connected through a diode 166 to the output circuit of the general reset gate 156. A logic "0" (reset signal) developed by the general reset gate 156 switches the home flip-flop 164 into a set condition. The home flip-flop stage remains set until the pulse motor 38 reaches the home position. When the pulse motor reaches the home position the home indicator switch 162 applies a logic "0" to the home flip-flop 164 terminal 101, switching the flip-flop into a reset position.

An output terminal 103 of the home flip-flop 164 is connected ot the input terminal 158 of the general reset gate 156. When the home flip-flop 164 is set, a logic "1" is applied to the input terminal 158 of the general reset gate 156 to seal in the general reset gate 156 in a reset condition (logic "0" output) until the pulse motor reaches the home position wherein the home indicator switch 162 is closed and the logic "1" input removed.

The terminal 104 of the home flip-flop 164 is also connected to a terminal 146 (FIGURES 7 and 8) which in turn is connected to the input terminal 144 of the home drive gate circuit 134 (FIGURE 7). Whenever the home flip-flop circuit 164 is in a set condition a logic "0" is applied to the input circuit 144 wherein a logic "1" appears at the output circuit of the home drive gate 134 each time the signal generated at the pulse generator 30 output terminal #10 is switched into a logic "0" condition. A train of pulses will be applied through either the diodes 138 or 140 as determined by the switch 136 to drive the pulse motor 138 into the home position.

The logic "1" signal on the input circuit 154 of the general reset gate 156 is initially removed when starting operation by momentarily closing the start push button 148 thereby applying the logic "0" to the terminal 104 of the general reset flip-flop 150 to set the flip-flop. With the removal of the logic "1" signals from both the input terminals 154 and 158 the output of the general reset gate 156 will switch to a logic "1" removing the general reset signal from the shift registers, thereby allowing the operation of the control system to begin. At this time the shift registers of the counter circuits 54 and 56 and the control period register 72 will accept a start pulse from the pulse generator 30 output terminal #12 (since the logic "0" blocking signal is removed from the blocking diode 160).

After the first stages of the counter shift registers have been preset by a start signal, the counter 54 accepts advance counting pulses from the pulse generator 30 output terminal #11 (coupled through an inverter amplifier 168 and an integrator circuit 170 to the treminals 102 of the serially connected flip-flop stages). The output terminal #0 of the first flip-flop stage of the counter 54 (FIGURE 8) is coupled through a diode 172 to the terminal 104 of a block start flip-flop stage 176. The terminal 104 is also coupled through a blocking diode 174 to the pulse generator 30 output terminal #12. The terminal 101 of the block start flip-flop stage 176 is connected to the output of the general reset gate 156. Once the first stage of the shift register of counter 54 is preset a logic "0" is applied to the terminal 104 of the block start flip-flop stage 176 and also the blocking diode 174 setting the flip-flop stage 176 to prevent any further starting pulses to be applied to the preset diodes 110 until a counting cycle has been completed, at which time a general reset logic 0 will be applied to the terminal 101 to reset the block start flip-flop stage 176.

When the shift register of counter 54 has counted ten pulses, it will cause the shift register 56 to advance by one. This process is continued until 100 sector pulses have been counted. At this time, a logic "0" developed at the output terminal #9 of the counter 56 is applied to the terminal 100 of the home flip-flop stage 164 to set the flip-flop to a home drive condition and provide a general reset signal for all the shift registers.

If the pulse motor 38 is at the home position when the counted cycle is completed the home indicator switch 162 is closed preventing the setting of the home flip-flop 164, thereby preventing a general resetting operation. Since a general reset is necessary at the completion of each counting cycle, a one shot multivibrator circuit 180 is included to provide a 50 microsecond general reset signal. The one shot multivibrator circuit 180 includes an input circuit 182 coupled to the counter 56 output terminal #9 for applying a trigger signal for setting the multivibrator upon completion of a counting cycle. The multivibrator 180 is connected to the output circuit of the general reset gate 156 to apply a logic "0" to the general reset circuit (to all the shift registers, etc.), for a period of 50 milliseconds allowing all the circuits to be reset for another cycle of operation. If the pulse motor 38 is not in the home position at the completion of the counting cycle the home flip-flop 164 is set providing a logic "1" to the general reset gate 156 and the control system would be reset by another cycle of operation as previously described.

Recognition of the selected control data points is achieved when the units and the tens counts stored in the shift registers of the counter 54 and 56, respectively, corresponds to the units and tens digits selected by the count selectors 64 and 66, respectively. As an example, if the control period selector means 62 #1 selects a unit digit of 2 (counter 54 output terminal #2) and a tens digit of zero (counter 56 output terminal #0) recognition of the first control data point is reached when the first stage of the counter 56 and the third stage of the counter 54 have been set, which correspond to a count of three pulses. The first pulse counted is actually the start or preset pulse applied through the preset diodes 110. As a result to achieve a sector count of 02 the system will count the start pulse and 2 sector pulses.

When a control data point has been recognized, the logic "1" signal developed by the corresponding drive gate circuit 68 is transmitted to the control shift register through the diodes 118 and the integrator circuit 120. As previously mentioned the control shift register has a dummy first stage, the function of which is to preset the register. Hence when the first control point has been reached, it will cause the control period register to move to its first active position, (produce a logic zero at the control period register output terminal #1.)

Setting of the first active stage in the control shift register 72 removes the block condition on the first drive gate circuit 46 (#1). A pulse train determined by the frequency selected by the rate selector means 52 (#1) is allowed to pass through the drive gate circuit 48 as long as the first active stage of the control shift register remains set. The pulse train is then coupled through the direction control means 44 to the pulse motor 38 to provide for a movement in a direction determined by the connected switch 126.

Recognition of the second control data point causes the control period register 72 to set its second active stage while the first active stage is reset. At this time the drive gate circuit 68 (#2) is unblocked and the drive gate circuit 68 (#1) is blocked. The speed selected for the second control period by the connected rate control means 52 (#2) is now applied via the direction control means 44 to the pulse motor 38. This process is continued until the sector count of the control system has reached 100, at which time a logic "1" developed at the counter 56 output terminal #9 is applied to the home drive flip-flop 164 or the one shot multivibrator circuit 180 to effect the general system reset.

A pair of limit switches 186 and 188 (FIGURE 7) are connected between the input circuits of the amplifiers 128 and 130 and ground and are coupled to the pulse motor 38 shaft to set the maximum forward and reverse position limits. The respective limit switch is actuated when the pulse motor shaft is driven beyond a desired limit. The limit switch is closed thereby blocking any further pulses that can be applied to the respective amplifier.

Stop and continue functions are provided by a pair of momentary push button switches 190 and 192, respectively (FIGURE 8). The stop button 190 is connected between ground and a terminal 104 of a stop-continue flip-flop stage 194. When the stop button is depressed it sets the stop-continue flip-flop 194 providing a logic "1" at the terminal 101. The logic "1" is coupled through an inverter amplifier circuit 196 to provide a logic "0" at a blocking diode 198 connected between the amplifier 168 and the pulse generator 30 output terminal 11. The logic "0" at the blocking diode 198 prevents any sector counts from being applied to the counter circuit 54. The output of the inverter amplifier is also coupled to a terminal 200 connected to a pair of motor drive blocking diodes 202 and 204 (see FIGURE 7). The logic "0" prevents any pulses from being applied to either of the amplifiers 128 and 130 while the stop-continue flip-flop 194 is set.

The continue push button 192 is connected between the terminal 101 of the stop-continue flip-flip 194 and ground, and when depressed, resets the stop-continue flip-flop 194 removing the logic "0" signal from the blocking diodes 198, 202 and 204 thereby allowing the counting cycle to continue and the pulse motor to be correspondingly driven. A terminal 103 of the stop-continue flip-flop 194 is connected to the output circuit of the general reset gate 156 to receive a logic "0" for resetting the stop-continue flip-flop stage for a new cycle of operation.

With the control system of FIGURES 7 and 8, the action of the cam 15 and the cam follower 14 of FIGURE 5 is electrically duplicated by setting the controls as illustrated in FIGURE 6. The count selectors 64 and 66, the rate selectors 52 and the direction controls 44 corresponding to an above listed channel number are preset as designated. The number listed in the count selector row designates the units and tens settings of the count selectors 64 and 66, respectively. The letters F, N and R in the direction control rows correspond to the forward neutral and reverse positions of the switches 126 for applying the signal to the forward input circuit 40, the open circuit position and the reverse input circuit 42 respectively. The number in the rate selector row designates the selected pulse generator 30 output terminal 7. The letter "X" is inserted in the rate selector row where the direction control is set at neutral since the corresponding channel output circuit is open circuited and the connected rate selector 52 can be set at any position.

The curve 25 of FIGURE 6 illustrates the signal pulses being applied to the forward input circuit 40 by the signal translating channels 36, #1 and #4, during the control period 1 and 4, respectively. The curve of FIGURE 6 illustrates the signal pulses being applied to the reverse input circuit 42 by the signal translating channels 36, #3 and #10, during the control period 3 and 10, respectively. After the count of 100 is reached the control system is reset for another cycle of operation to simulate the next revolution of the cam 15.

Several controlled elements may be simultaneously controlled or a single controlled element can be simultaneously driven in several directions by providing a separate control circuit for each controlled element or each direction as illustrated in FIGURE 10. With three control circuits (corresponding to the X, Y and Z coordinates) a controlled element can be driven in any direction. Each separate control circuit includes a pulse motor 38, a plurality of signal translating channels 36 (each including the required rate selectors 52, and drive gates 46 and direction control means 44 if necessary) and a timing circuit including a shift register 72 and a plurality of control period selectors 62. In addition each control circuit will include, if necessary, a home logic circuit 39 (including a home indicator switch 162, a home flip-flop stage 164 and a home drive signal translating channel 132). The control circuits are interconnected and connected to a common pulse generator 30 and the common counters 64 and 66 as illustrated in FIGURES 1, 7, 8 and 10 to drive their separate pulse motors. If desirable, separate pairs of counters 54 and 56 may be included in each control circuit rather than the common pair as illustrated.

Only one pulse generator 30 is required to provide the timing pulses for all the control loops. The production rate of the automatic process can be increased or decreased by changing the angular velocity of the pulse generating disk 82. Since, as previously mentioned, the number of pulses per preset control period does not change as the velocity of the pulse generating disk 82 is changed (only the pulse rate), the total distance traveled by each controlled device per control period remains the same. The controlled devices travel in predetermined paths in a time related synchronous manner independent of the angular velocity of the disk 82 providing simultaneous contour control for each controlled device at an infinite number of production rates.

I claim:
1. The combination comprising:
   signal generating means for generating a plurality of periodic signals of different frequencies;
   a plurality of signal translating channels, each of said channels having a switching circuit for rendering said channel operative for translating a signal applied thereto;
   circuit means coupled between said signal generating means and each of said signal translating channels for variably selecting various ones of said periodic signals to be applied thereto; and
   circuit means coupled between said signal generating means and said plurality of switching means for counting at least one of said periodic signals and providing a plurality of successive switching signals having a variably preset time duration and applying said switching signals to said plurality of switching circuits for rendering said plurality signal translating channels operative in predetermined order for the duration of the switching pulse applied thereto, so that trains of periodic signals are translated by said channels, the number of cycles in said trains being determined by the frequency of the periodic signal applied thereto and the duration of the switching signal.

2. The combination as defined in claim 1 including:
   a device for providing a predetermined motion in response to a signal applied thereto, and
   circuit means coupling said plurality of signal translating channels to said device for applying said trains of periodic signals thereto.

3. The combination as defined in claim 1 including:
a stepping motor for providing substantially accurately duplicated output motion in response to a cycle of a signal applied thereto, said stepping motor including a first and a second input terminal for determining the direction of motion of said stepping motor output motion;
a plurality of switching means, and
circuit means coupling a separate switching means between each of said plurality of signal translating channels and said stepping motor first and second input terminals, said switching means being adapted to variably select one of said first and second input terminals for applying said trains of periodic signals translated by said signal translating channels.

4. The combination as defined in claim 1 including:
means coupled to said signal generating means for controlling the frequencies of said generated plurality of periodic signals so that said frequencies can be changed simultaneously wherein the frequency ratio between said plurality of periodic signals remains constant.

5. The combination as defined in claim 1 including:
a device for providing a predetermined output movement in response to a cycle of a signal applied thereto,
circuit means coupling said plurality of signal translating channels to said device, said circuit means being adapted to apply said train of periodic signals translated by each said signal translating channels to said device to provide a controlled output movement per train of periodic signals;
means coupled to said signal generating means for controlling the frequencies of said generated plurality of periodic signals so that said frequencies can be changed simultaneously and proportionally wherein the frequency ratio between said plurality of periodic signals remains constant so that said controlled output movement per train of periodic pulses remains the same as the frequencies of said periodic signals are changed, but the rate of output movement changes as a function of the change in frequencies.

6. A control system comprising:
signal generating means having a plurality of output circuits for generating in each of said output circuits a separate signal having a distinct frequency;
motor means for providing a predetermined movement in response to a cycle of a signal applied thereto, wherein the rate of motion is determined by the frequency of the signal applied thereto;
a plurality of signal translating channels coupled between said signal generating means and said motor means for applying translated signals thereto; each of said channels including a first switching circuit for turning the channel on for translating signals applied thereto and a second switching circuit coupled to various ones of said signal generating means output circuits for variably selecting at least one of said generated signals to be translated;
a first counting circuit coupled to at least one of said signal generating means output circuits for counting cycles of frequency generated therein, said counting circuit including a plurality of output circuits for developing a switching signal therein that is a function of the number of cycles counted;
a second counting circuit including an input circuit for receiving switching signals to be counted and a plurality of output circuits corresponding to at least the number of signal translating channels, for developing switching signals in successive ones of said plurality of output circuits as a function of the number of switching signals counted;
a plurality of variably preset switching circuits corresponding to at least the number of signal translating channels, coupled between said plurality of first counting circuit output circuits and said input circuit of said second counting circuit, each of said variably preset switching circuits being adapted to couple various ones of said first counting circuit output circuits to said second counting circuit input circuit for applying a switching signal to be counted, and
circuit means coupling said plurality of second counting circuit output circuits to separate ones of said signal translating channels first switching circuits for turning said plurality of signal translating channels on and off in successive order in a timing sequence and for a time duration as determined by the settings of said variably preset switching circuits.

7. The control system as defined in claim 6 wherein the signal generating means comprises:
a light source and a plurality of light detectors mounted adjacent each other so that said light detectors are responsive to said light source;
a disk having a plurality of holes therein formed in consecutive circles about the center of said disk corresponding to the number of light detectors;
circuit means for mounting said disk between said light source and said plurality of light detectors and for rotating said disk about its center so that the holes in each circle pass in successive order between said light source and one of said light detectors wherein a signal pulse is generated by said light detectors as a hole passes a light detector, and
means for variably controlling the speed of rotation of said disk thereby controlling the frequencies of the pulses generated by said light detectors in a constant ratio wherein the output movement of said motor means per signal translating channel is a function of the setting of said second switching circuit and said variably switching circuit and is independent of the speed of rotation of said disk.

8. The control system as defined in claim 6 in which:
each of said first and second counting circuits includes means for resetting said counting circuits for a new counting cycle, and
reset circuit means coupled to said first and second counting circuits for receiving a signal from one of said first and second counting circuits upon completion of a counting cycle, and for applying a reset signal to said first and second counting circuits.

9. The control system as defined in claim 8 including;
detection means coupled to said motor means to develop a signal when said device is in a start position;
an additional signal translating channel coupled between at least one of said signal generating means output circuits and said motor means for applying signals thereto, said channel including a switching circuit for turning said channel on, and
circuit means coupling said additional signal translating channel switching circuit to said reset circuit means and said detection means so that said reset signal turns said channel on until said device is in said start position.

10. A control system comprising:
a plurality of positioning devices;
a signal generator generating a plurality of periodic signals of different frequencies;
a plurality of signal translating channels, each including a switching circuit being responsive to a switching signal for rendering said signal translating channels in condition for translating signals applied thereto;
a plurality of variable switching circuits corresponding to the number of signal translating channels;
circuit means coupling said plurality of variable switching circuits between said signal generator and at least one of said plurality of signal translating channels for variably selecting at least one of said periodic signals to be translated by said signal translating channels;

circuit means coupling separate groups of said plurality of signal translating channels to each of said plurality of positioning devices for applying translated signals thereto;

a counting circuit coupled to said signal generator means for counting at least one of said periodic signals;

a plurality of switching signal generating means corresponding to the number of said plurality of signal translating channels, each including a variable switching preset means for coupled said switching signal generating means to said counter circuit whereby said switching signal generating means generates a switching signal after a variable preset number of periodic signals are counted by said counter circuit, and circuit means coupling separate ones of said switching signal generating means to said groups of plurality of signal translating channels for applying said switching signal thereto for rendering the signal translating channels in said groups of signal translating channels operative in consecutive order for the duration of a switching signal applied thereto so that trains of periodic signals are translated by said groups of signal translating channels to the coupled positioning devices, the number of cycles in said trains being determined by the frequency of the periodic signal selected by said plurality of variable switching circuits and for a duration determined by said variable switching preset means.

11. A control system as defined in claim 10 including:
means coupled to said signal generating means for controlling the frequencies of said generated plurality of periodic signals so that said frequencies can be changed simultaneously and proportionally wherein the frequency ratio between said plurality of periodic signals remains constant.

12. A control system for controlling the movement of at least one controlled element comprising at least one signal generating means for generating a plurality of signals of different frequencies, at least one counter circuit means coupled to said signal generating means for counting at least one signal and generating timing signals, motor means adapted for controlling at least one controlled element, control signal generating means coupled to said counter circuit means, including circuit means for setting a changeable pattern of information, for generating control signals responsive to said pattern of information and said timing signals, signal translating circuit means connected between said control signal generating means and said motor means for rendering said signal translating circuit means in condition for translating signals applied thereto, coupling means coupling said signal generating means to said signal translating circuit means including circuit means for setting a changeable pattern of information for selecting desired ones of said plurality of signals to be applied to said signal translating circuit means, whereby said motor means moves said controlled element responsive to the changeable pattern of information in said control signal generating means and said coupling means.

13. A control system comprising:
signal generating means for generating a plurality of periodic signals of different frequencies;
an output device;

a plurality of switching means, each including an input for receiving control signals for actuation thereof;
variable means coupling said plurality of switching means to said signal generating means for selectively applying various ones of said periodic signals to said plurality of said switching means;
counting means coupled to said signal generating means for counting at least one of said plurality of periodic signals;
control means coupled to said counting means for generating a plurality of control signals having preset time durations and occurring in a predetermined sequence, and
means coupling said control means to the inputs of said plurality of said switching means for applying said control signal thereto so that said plurality of said switching means are actuated for preset time durations and in a predetermined sequence to translate trains of periodic signals, the number of cycles in a train being determined by the frequency of the periodic signal applied to the switching means actuated and the time duration of the control signal.

14. A control system comprising:
signal generating means for generating a plurality of periodic signals of different frequencies;
an output device;
switching means coupled between said signal generating device and said output device having a plurality of inputs for receiving control signals for the actuation thereof for translating selected ones of said plurality of periodic signals to said output device as a function of the input receiving said control signal;
first counting means coupled to said signal generating means for counting at least one of said plurality of periodic signals and producing a plurality of sequential switching signals having different periods synchronized to said signal generating means;
second counting means counting signals and providing sequential control signals;
variable means coupling said second counting means to said first counting means for controlling the switching signals to be counted by said second counter circuit so that control signals have variably preset time durations, and
means coupling said second counting means to said plurality of inputs of said switching means so that said plurality of control signals sequentially actuate said switching means to translate sequential trains of periodic signals wherein the number of cycles of periodic signals in a train is determined by the periodic signal being translated and the time duration of the control signals applied thereto.

References Cited

UNITED STATES PATENTS

| | | | |
|---|---|---|---|
| 3,286,085 | 11/1966 | Rado | 235—151.11 |
| 3,297,929 | 1/1967 | Gardner et al. | 235—151.11 X |
| 3,375,354 | 3/1968 | McGarrell | 235—151.11 |

MALCOLM A. MORRISON, *Primary Examiner.*

JOSEPH F. RUGGIERO, *Assistant Examiner.*

U.S. Cl. X.R.

235—92, 150.4; 318—162; 340—147

PO-1050
(5/69)

UNITED STATES PATENT OFFICE
CERTIFICATE OF CORRECTION

Patent No. 3,445,639            Dated    May 20, 1969

Inventor(s)     Alexander E. Martens

It is certified that error appears in the above-identified patent and that said Letters Patent are hereby corrected as shown below:

Column 8, line 72, change "sections" to -- sectors --

Column 13, line 75, after "curve" insert -- 26 --

SIGNED AND
SEALED

NOV 4 1969

(SEAL)
Attest:

Edward M. Fletcher, Jr.
Attesting Officer

WILLIAM E. SCHUYLER, JR.
Commissioner of Patents